United States Patent
Tambascio et al.

(10) Patent No.: US 7,541,920 B2
(45) Date of Patent: Jun. 2, 2009

(54) ALARM/EVENT ENCRYPTION IN AN INDUSTRIAL ENVIRONMENT

(75) Inventors: Kevin Tambascio, Lyndhurst, OH (US); Kenwood H. Hall, Hudson, OH (US); John J. Baier, Mentor, OH (US); Eric G. Dorgelo, Port Moody (CA); Charles M. Rischar, Chardon, OH (US); David K. Johnson, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 291 days.

(21) Appl. No.: 11/537,413

(22) Filed: Sep. 29, 2006

(65) Prior Publication Data

US 2008/0079597 A1 Apr. 3, 2008

(51) Int. Cl.
*G08B 29/00* (2006.01)
*H04L 9/00* (2006.01)
*H04K 1/00* (2006.01)

(52) U.S. Cl. .................. 340/506; 340/505; 340/500; 340/525; 380/30; 380/277; 713/182; 726/2

(58) Field of Classification Search .................. 340/506
See application file for complete search history.

(56) References Cited

U.S. PATENT DOCUMENTS

| | | | |
|---|---|---|---|
| 5,940,591 A * | 8/1999 | Boyle et al. ............... 726/3 |
| 6,240,183 B1 * | 5/2001 | Marchant .................... 380/28 |
| 6,539,478 B1 | 3/2003 | Furuya et al. | |
| 6,691,231 B1 * | 2/2004 | Lloyd et al. ................. 726/5 |
| 6,725,104 B2 | 4/2004 | Lo et al. | |
| 6,895,502 B1 * | 5/2005 | Fraser ...................... 713/168 |
| 7,079,020 B2 | 7/2006 | Stilp | |
| 2003/0023867 A1 * | 1/2003 | Thibadeau ................ 713/200 |
| 2003/0060900 A1 | 3/2003 | Lo et al. | |
| 2005/0210532 A1 | 9/2005 | Winick | |

* cited by examiner

*Primary Examiner*—Donnie L Crosland
(74) *Attorney, Agent, or Firm*—Amin Turocy & Calvin LLP; William R. Walbrun

(57) ABSTRACT

Systems and methods that can enhance protection of alarms and events within an industrial control environment are provided. An alarm security component employs cryptographic mechanisms and techniques to encrypt alarms and/or events related to field devices of an industrial controller system. Also included is a two-way mutual authentication using cryptography, thereby ensuring that an alarm is a valid alarm and that the clients using the alarms are authorized alarm clients. Effectively, the innovation can regulate access to alarms and events by unauthorized external entities (e.g., monitors and/or users) by employing cryptographic mechanisms.

25 Claims, 11 Drawing Sheets

ALARM/EVENT ENCRYPTION IN AN INDUSTRIAL ENVIRONMENT

TECHNICAL FIELD

The claimed subject matter relates generally to alarms and events within an industrial setting, and, more particularly, relates to applying security to alarms and events by employing cryptographic algorithms and techniques.

BACKGROUND

Due to advances in computing technology, businesses today are able to operate more efficiently when compared to substantially similar businesses only a few years ago. For example, high speed data networks enable employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For example, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

In typical control applications, alarms are generated when a process variable value lies outside a predefined expected range, when a sensed parameter lies outside an expected range, when particular user action is undertaken (such as depression of an emergency stop), and the like. These alarms provide an indication to an operator or device that an unexpected event has occurred with respect to a particular control process. In another example, alarms that are not associated with a high level of urgency can be created and logged, and may not be provided to an operator unless a more urgent, related alarm occurs. Thereafter, logs can be parsed in an effort to determine a source of failure with respect to a control process.

Conventionally, field devices produce or consume data and are monitored by a higher-level system, such as a Manufacturing Execution System (MES). These higher-level systems analyze data being produced and/or consumed on a factory floor and generate alarms if monitored data lies outside a predefined range. In large facilities, a large number of alarms can be generated in a small amount of time, wherein order of generation depends upon an order that data is received at the high-level system (which can often depend upon communication medium, length of travel of data, etc.). Thus, alarms can be generated out of a desired order and may not be associated with a precise time of an event that caused such alarm. Additionally, these alarms are permeated throughout an industrial environment without regard to security clearance associated with a recipient.

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Briefly described, the subject specification discloses systems and mechanisms that can enhance protection of alarms and events within an industrial control environment. Specifically, in one aspect, the specification discloses an alarm security component that employs cryptographic mechanisms and techniques to encrypt alarms and/or events related to field devices of an industrial control system.

In another aspect, the specification discloses two-way mutual authentication using cryptography, thereby ensuring that an alarm (e.g., an alarm supplied by an alarm server) is, in actuality, a valid alarm and that the clients receiving the alarms are authorized alarm clients. For instance, alarms can be licensed to aid in avoidance of a controller being subject to spoofing.

Additionally, cryptography can be utilized to solely encrypt alarm and/or event communications between clients and servers (and not for all data delivered therebetween), thus reducing processing load. In one aspect, a public/private key pair can be utilized in connection with the aforementioned encryption. Pursuant to another example, encryption can be limited to when a subscriber attempts to subscribe to an alarm or alarm server (e.g., the subscriber must authenticate itself). For instance, the subscriber can be a tool, wherein the tool is utilized to perform user authentication (and not the server). The encryption undertaken in accordance with this invention can be asymmetric or symmetric.

In another aspect, the system can regulate access to alarms and events from external entities (e.g., monitors and/or users). This controlled access can be enabled through the use of cryptographic key pairs. In other words, the system can identify a public key that corresponds to an entity and thereafter encrypt the alarm and/or event utilizing the public key. In turn, the entity can employ the private key that corresponds to the public key to decrypt the alarm and/or event. In still other aspects, the system can generate and/or lookup an appropriate public key based upon an identity of an entity. This entity can be a subscribing entity to which the alarm and/or event will be sent.

To the accomplishment of the foregoing and related ends, certain illustrative aspects are described herein in connection with the following description and the annexed drawings. These aspects are indicative, however, of but a few of the various ways in which the principles of the invention can be employed and such subject matter is intended to include all such aspects and their equivalents. Other advantages and novel features will become apparent from the following detailed description when considered in conjunction with the drawings.

DETAILED DESCRIPTION

Figure 1:
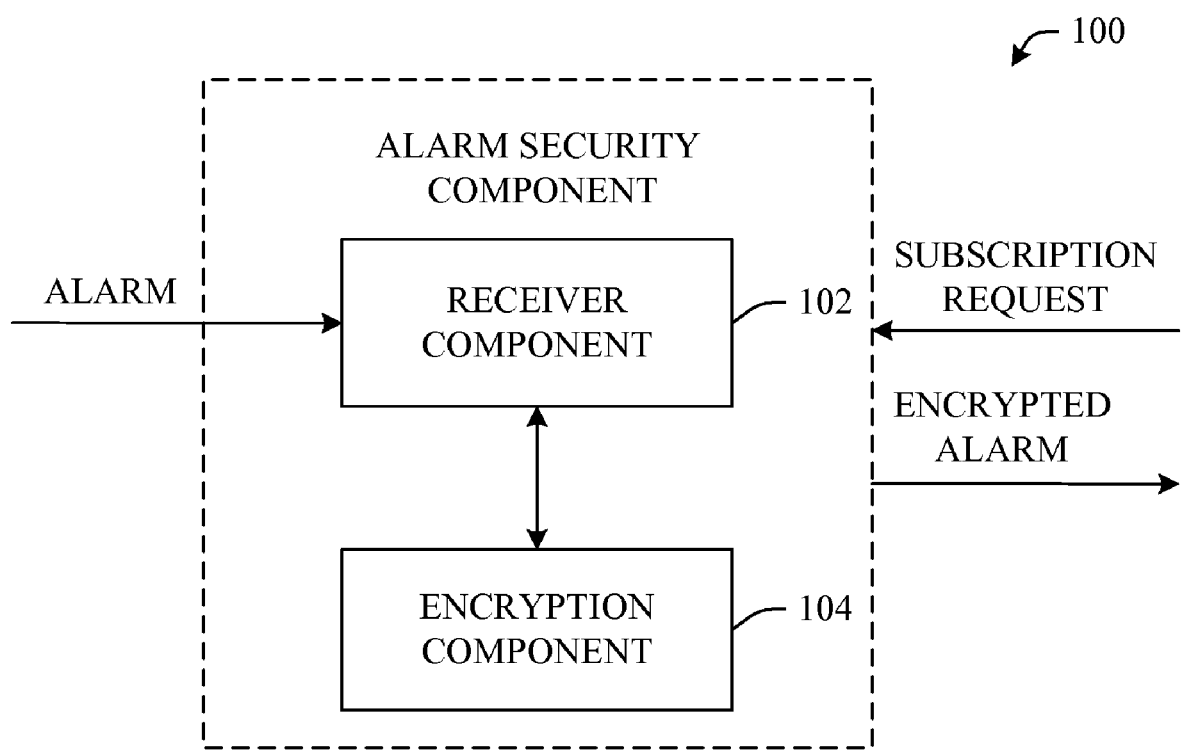
FIG. 1 illustrates an example system that facilitates encrypting alarms and/or events.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an alarm security component or system 100 that facilitates controlling access to alarms and/or events related to a manufacturing or industrial environment. More particularly, the alarm security component 100 can include a receiver component 102 and an encryption component 104 that facilitate securing access to alarms and/or events within an industrial or manufacturing environment.

Briefly described, the subject specification discloses systems and mechanisms that can enhance protection of alarms and events within an industrial control environment. In one aspect, the receiver component 102 receives an alarm (or event) whereby the encryption component 104 cryptographically protects the alarm. By way of example, an alarm can be generated when an out-of-tolerance situation is encountered within a manufacturing environment. Many times, this type of specific manufacturing information is proprietary or otherwise contains proprietary information such that unintentional distribution should be avoided. By cryptographically protecting this information, the system 100 can avoid any unintentional distribution of the information.

In another aspect, a subscription request can be received from an entity (e.g., monitor server, user) for access to alarms and/or events. This request can be received by the receiving component 102 and in order to secure access, the information (e.g., alarms, events) transferred to the entity can be encrypted using a public key that corresponds to a private key of the entity. More specifically, in one aspect, the specification discloses an alarm security component 100 that employs cryptographic mechanisms (e.g., via encryption component 104) and techniques to encrypt alarms and/or events related to field devices of an industrial controller system.

Figure 2:
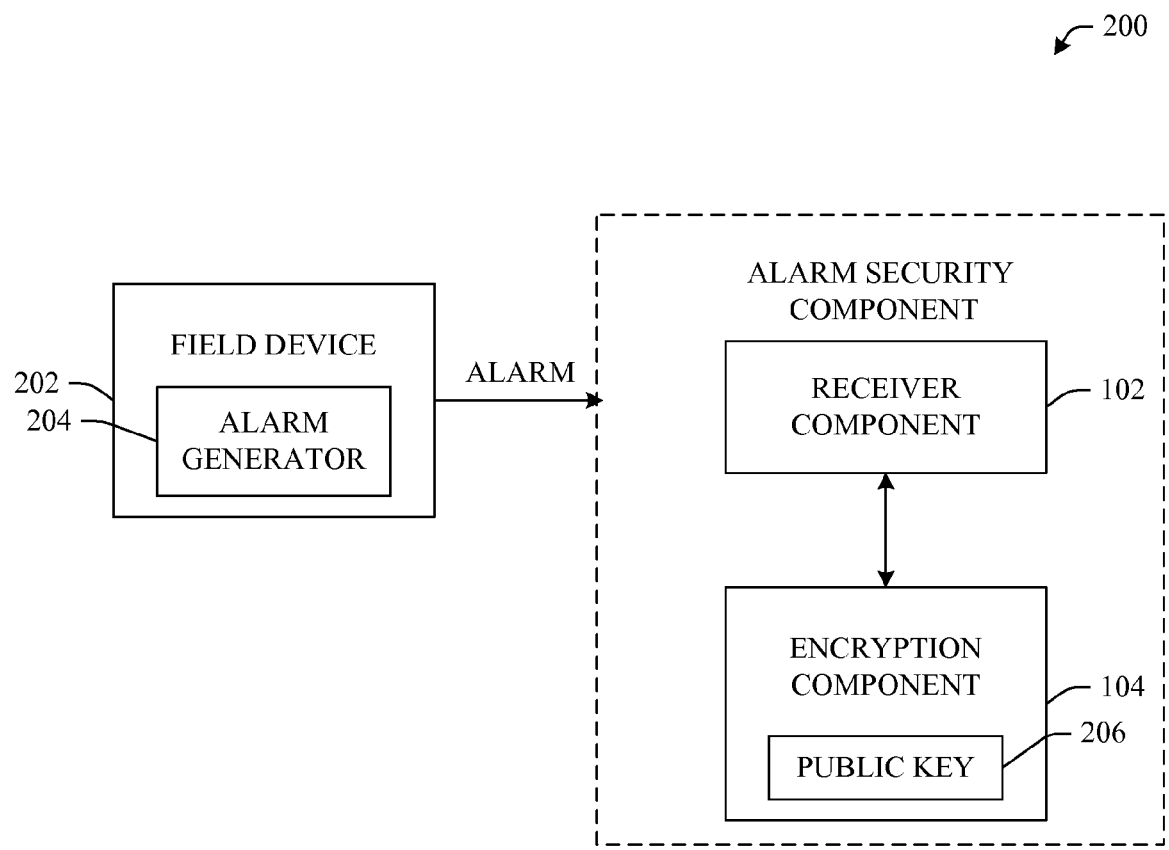
FIG. 2 illustrates an example system that encrypts an alarm from a field device.

FIG. 2 illustrates another example system 200 that facilitates securing alarms and/or events associated with an industrial automation system. As shown, system 200 can include a field device 202 having an alarm generator component 204. The field device 202 can be representative of a device within a manufacturing environment, for example, an actuator, a sensor, a controller, or other suitable device that resides on a factory floor that produces and/or consumes data.

The alarm generator component 204 can establish an alarm or event associated with the particular field device 202. For example, if a device senses an out-of-tolerance or other manufacturing disruptive event, the alarm generator component 204 can transmit alarm data to the receiving component 102. Thus, as described supra, the encryption component 104 can employ a public key 206 of a cryptographic key pair to encrypt the data. This encryption can secure the data during transmission to a remote monitor or user. Thus, the remote monitor or user can employ the private key associated with the public key to decrypt the data.

Figure 3:
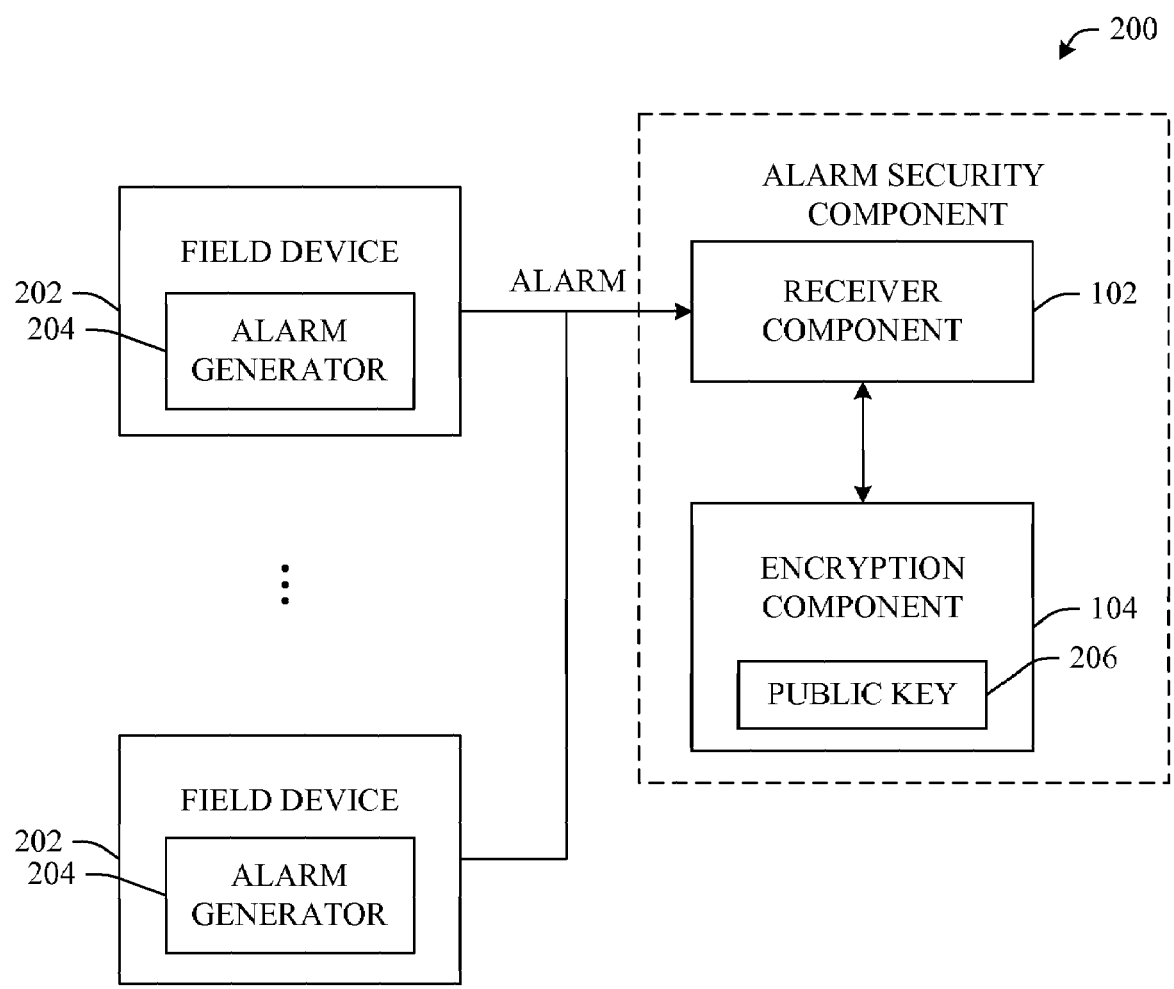
FIG. 3 illustrates an example system that encrypts alarms from multiple field devices.

FIG. 3 illustrates an example architectural block diagram of system 200. As shown, system 200 illustrated in FIG. 3 can enable receipt and process of multiple alarms from multiple field devices 204. It will be understood that these multiple devices can be co-located within a single manufacturing environment (e.g., factory) or distributed between manufacturing environments.

It is to be understood and appreciated that each of the alarms received from the field devices 202 can be encrypted based upon a variety of characteristics. For example, the receiving component 102 can analyze the alarm data, determine the proprietary nature of the data and thereafter employ an appropriate encryption algorithm (e.g., strength) based upon the level of protection desired. Similarly, the receiving component 102 and the encryption component 104 can consider contextual factors (e.g., time, date, process urgency) in order to infer and/or determine the desired encryption method and public key 206 to employ.

In doing so, the system 200 can employ artificial intelligence (AI) and/or machine learning and reasoning (MLR) techniques to infer an appropriate encryption algorithm based upon alarm/event type, context, etc. These AI and MLR mechanisms facilitate automating one or more features described herein. As stated above, the disclosed subject matter (e.g., in connection with encryption algorithm selection) can employ various AI-based schemes for carrying out various aspects thereof. For example, a process for determining when to encrypt, what algorithm to employ, what cryptographic key to employ, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, classifiers that are explicitly trained can be employed (e.g., via a generic training data) as well as implicitly trained classifiers (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when encryption is necessary, preferred or suggested, what type (e.g., strength) of encryption should be employed, what public key to employ (e.g., based upon identity, context, alarm/event type), etc.

Figure 4:
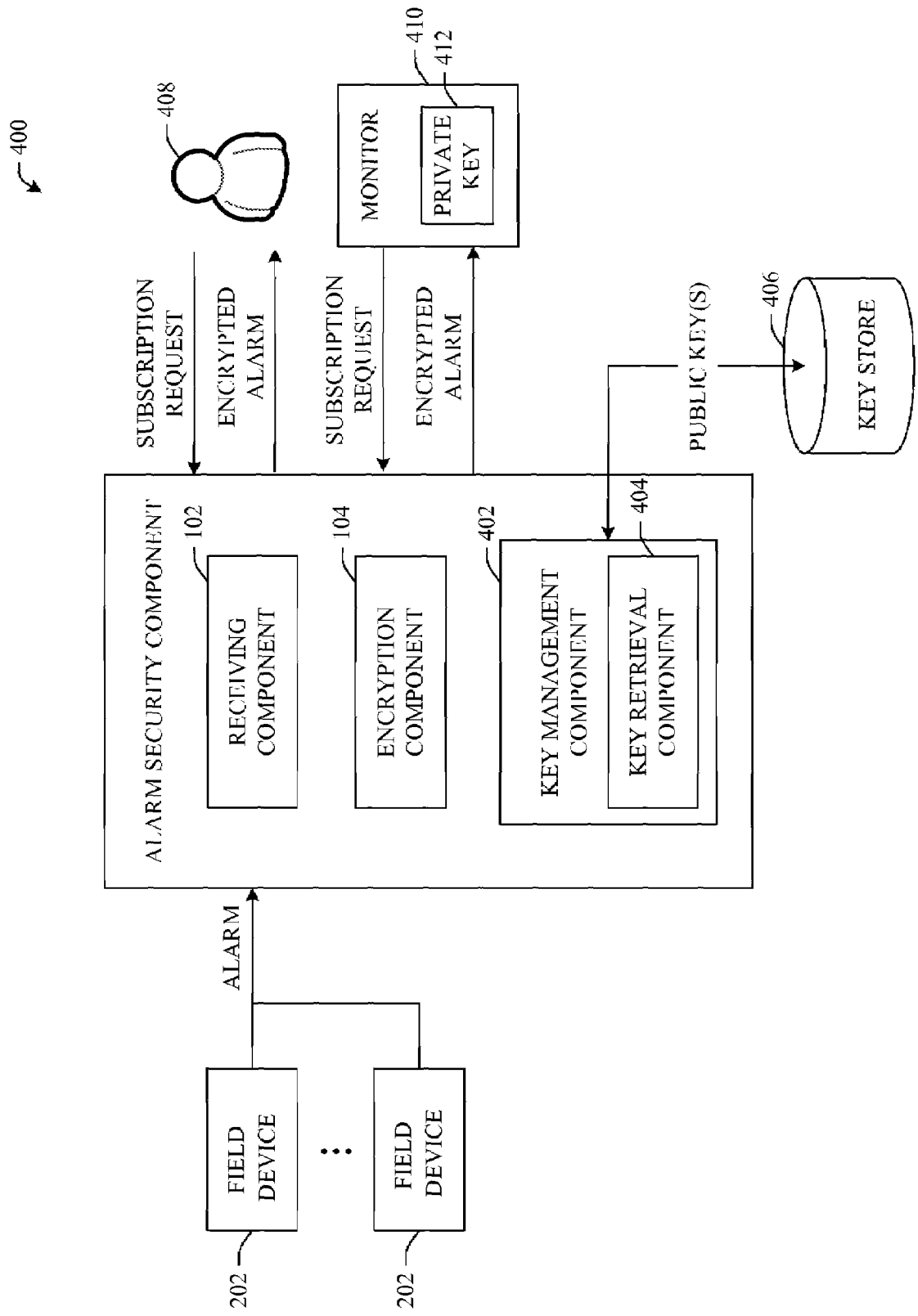
FIG. 4 illustrates an example system that employs a key management component that identifies an encryption key.

Turning now to FIG. 4, a system 400 that facilitates securing communications between an alarm security component and a requester entity is shown. More particularly, the system 400 discloses two-way mutual authentication using cryptography, thereby ensuring that an alarm (e.g., an alarm supplied by field device 202) is, in actuality, a valid alarm and that the clients requesting the alarms are authorized alarm clients. For instance, alarms can be licensed to aid in avoidance of a controller being subject to spoofing.

In doing so, the system 400 can employ a key management component 402 that identifies and retrieves the necessary cryptographic keys to employ in encrypting alarms and events. These cryptographic keys can be retrieved by a key retrieval component 404 that accesses keys stored within a key store 406. These keys can be indexed and/or stored as a function of user 408 or monitor 410 identity. Accordingly, the retrieval component 404 can retrieve a public key that corresponds to a private key 412 of the monitor (or user). This public key can be used by the encryption component 104 to secure the alarm/event data.

Effectively, the key management and key retrieval components (402, 404) facilitate management of keys and corresponding encryption operation(s). In operation, the receiver component 102 can receive an alarm subscription request from a user 408 or monitor 410 whereas the key management component 402 can analyze the request to automatically determine an appropriate public key with which to encrypt the alarm/event data prior to transmission to the user 408 or monitor 410. Essentially, this encryption can secure the transmission of the data while additionally ensuring that the receiving entity has authorization to the data. If the receiving entity does not have authorization to the data, it will not be able to decrypt the information as it will not have the appropriate private key needed for decryption.

Figure 5:
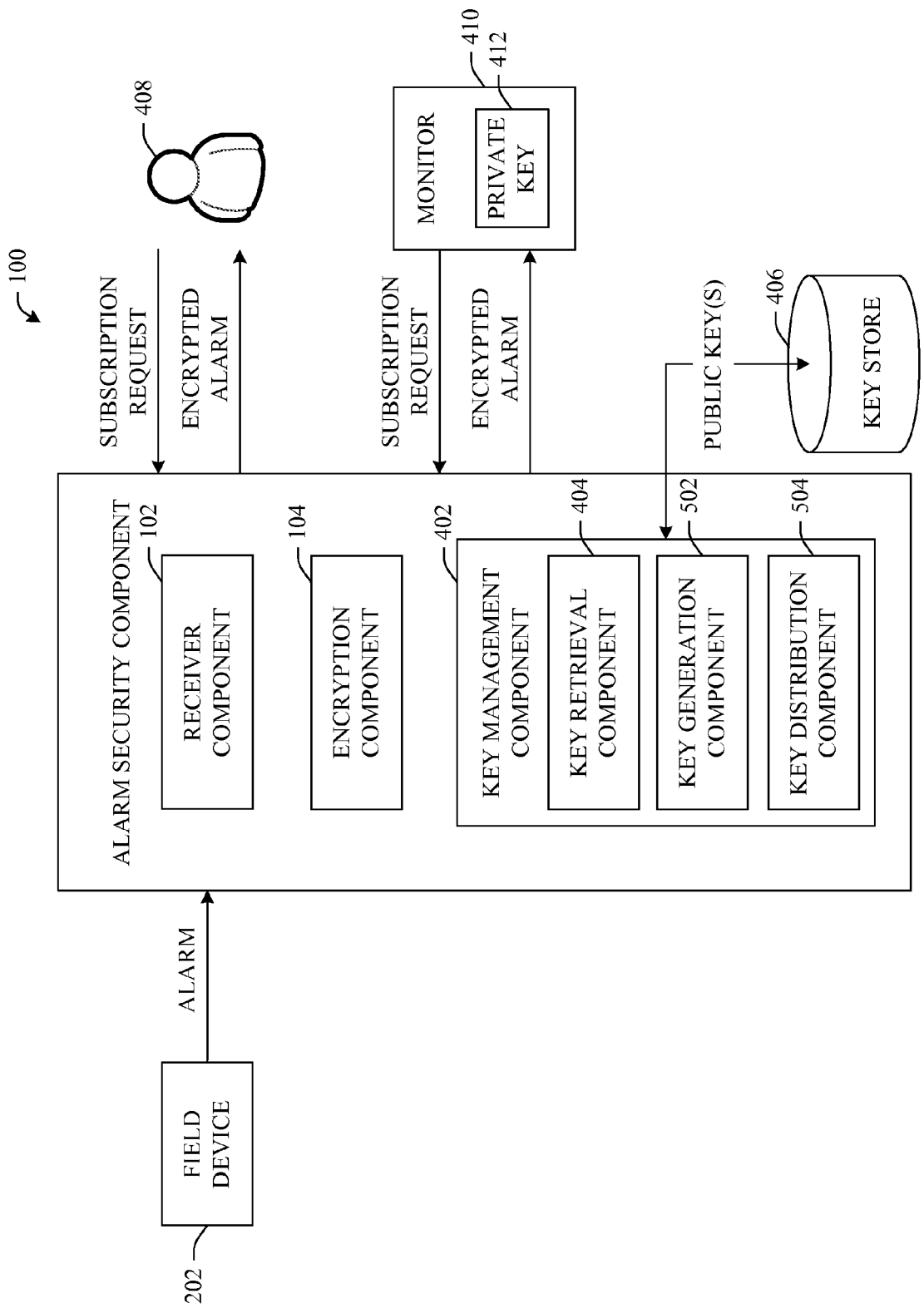
FIG. 5 illustrates an example system that employs a key management component that generates and distributes an encryption key.
Figure 6:
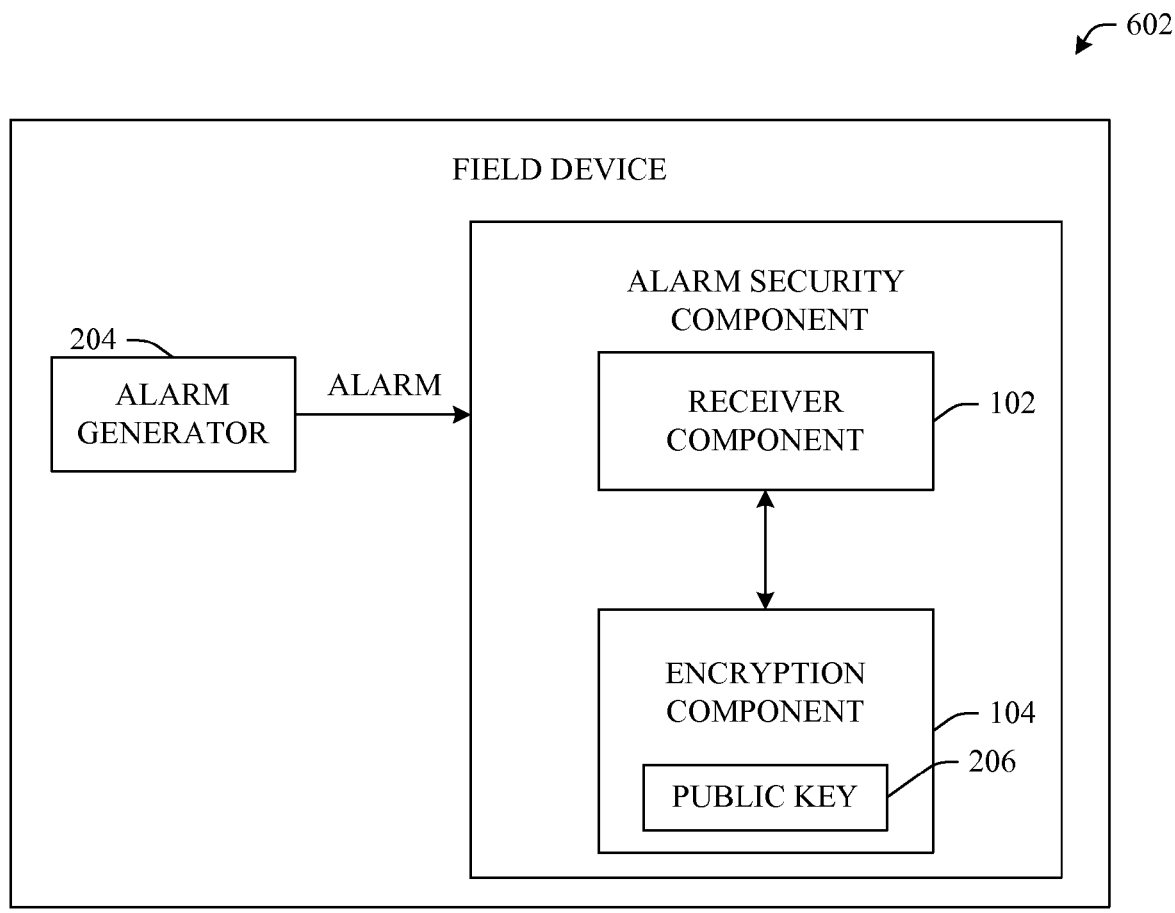
FIG. 6 illustrates an example field device that includes an alarm security component.

FIG. 5 illustrates yet another example of system 400 that facilitates securing alarm/event data. As described above, the key management component 402 can include a key retrieval component 404 which, if available, enables location of an appropriate key for encryption. As shown, the key management component 402 can also include a key generation component 502.

Upon analyzing a subscription request, the key retrieval component 404 can search a key store 406 for a key that matches a determined and/or inferred identity of the requestor (e.g., user 408, monitor 410). If the key is available in the key store 406, the key retrieval component 404 supplies the key to the encryption component 104 to encrypt the data. If, however, the key is not available in the key store 406, the key generation component 502 can be employed to establish and/or generate a key to be employed to encrypt the data. It will be understood that the key generation component 502 can employ proprietary mathematical algorithms to establish keys. As described above, it is to be understood that any asymmetric keying technique including, but not limited to Diffie-Hellman, DSS (Digital Signature Standard), ElGamal, RSA, PGP, Secure Socket Layer (e.g., TLS), etc. can be employed to secure alarm/event data in aspects.

Once a key is generated, it can be stored within the key store 406 for later use. As well, the private key portion of a key pair can be transmitted to a monitor or user via a secure envelope. In other aspects, e.g., symmetric keying systems, the encryption key can be destroyed as the intended user will be able to decrypt the data using the same or similar key.

As described, the innovation employs cryptography to encrypt alarm and/or event communications between clients and servers (and not always for all data delivered therebetween), thus reducing processing load. In one aspect, a public/private key pair can be utilized in connection with the aforementioned encryption. As shown in FIGS. 4 and 5, encryption can be employed when a subscriber attempts to subscribe to an alarm or alarm server (e.g., the subscriber must authenticate itself). For instance, the subscriber can be a tool, wherein the tool is utilized to perform user authentication (and not the server). As described in greater detail infra, the encryption algorithms employed can be asymmetric or symmetric.

It is to be appreciated that cryptography most often refers to a conversion of data into a secret code for transmission over a public network. In order to secure data transmission, the original text, or 'plaintext,' is converted into a coded equivalent called 'ciphertext' via a proprietary encryption algorithm. Subsequently, to restore the data to a readable form, the ciphertext can be decoded or decrypted at the receiving end to restore the data into plaintext.

Generally, proprietary encryption algorithms use a key, which is typically a binary number from 40 to 128 bits in length. The 'cipher strength' or 'encryption strength' is a function of the number of bits. For example, the greater the number of bits in the key, the more possible key combinations and, thus, the longer it would potentially take to break the code. The data is encrypted, or 'locked,' by mathematically combining the bits in the key with the data bits. At the receiving end, the key is used to 'unlock,' or decrypt, the code to restore the original data.

Conventionally, there are two cryptographic methods, 'symmetric' and 'public-key' cryptography. The traditional symmetric method uses a secret key, such as the DES standard. In accordance with symmetric cryptography, both sender and receiver use the same key to encrypt and decrypt. Symmetric key algorithms are generally faster than other cryptographic methods, but these methods sometimes involve transmitting a secret key to the recipient which can be difficult and sometimes not secure.

The second method is public-key cryptography, such as RSA, which uses both a private and a public key. Each recipient has a private key that is kept secret and a public key that is published for everyone. The sender employs the recipient's public key and uses it to encrypt the message. Upon receipt, the private key can be used to decrypt the message. In other words, because owners do not have to transmit their private keys to anyone in order to decrypt messages, the private keys are not in transit and are not vulnerable.

Still further, it is to be appreciated that multiple encryption techniques can be used to secure the data and keying material. For example, both DES (Data Encryption Standard) and RSA can be used together to encrypt data and secure keying material. It will be understood that DES provides for fast decryption while RSA provides a convenient method for transmitting the secret key. In this example, both the DES-encrypted text message and the secret key needed to decrypt the data can be sent via the RSA method in a 'digital envelope.'

Figure 7:
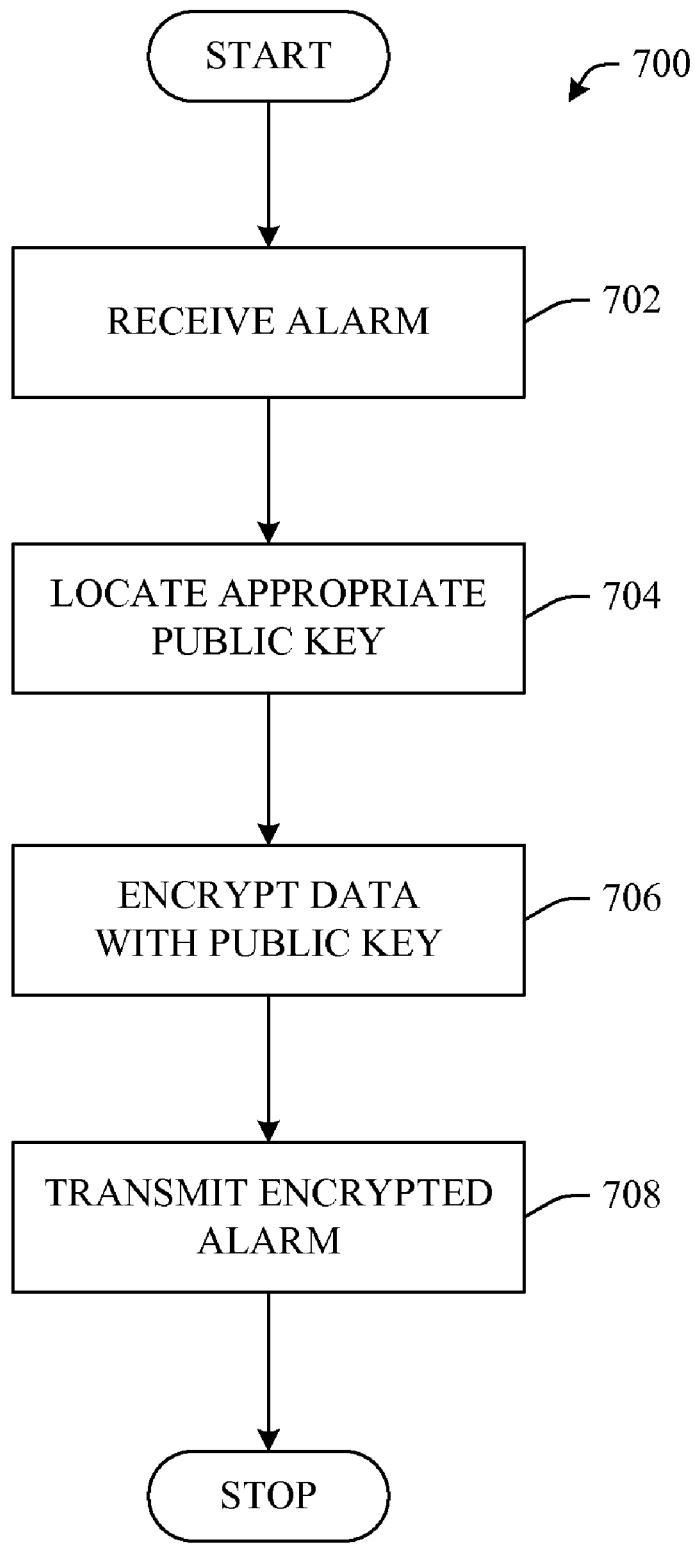
FIG. 7 is a representative flow chart illustrating a methodology for encrypting an alarm/event.

FIG. 7 illustrates a methodology of encrypting alarm/event data in accordance with an aspect of the innovation. While, for purposes of simplicity of explanation, the one or more methodologies shown herein, e.g., in the form of a flow diagram, are shown and described as a series of acts, it is to be understood and appreciated that the methodologies are not limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the methodologies described herein.

At 702, an alarm or event data related to a manufacturing or industrial environment is received. As described supra, this alarm data can be information related to an alarm or an alarm itself. For example, the data can be transmitted in separate data packets, streams or strings such that a scenario can be established. By way of further example, suppose an event occurs where a tool or machine is out-of-tolerance. In this scenario, information can be received separately that identifies that an error occurred, what error occurred, deviation from acceptable limitations/standards, etc.

At 704, an appropriate key can be located for which to encrypt the data. This key can be associated with the field device, type of data, type of alarm, identity of the requestor, etc. Once identified, the key can be utilized to encrypt the data at 706. Finally, the encrypted data can be transmitted at 708. It is to be appreciated that a corresponding key (e.g., private key) can be employed to later decrypt the data in order to make it comprehendible.

Figure 8:
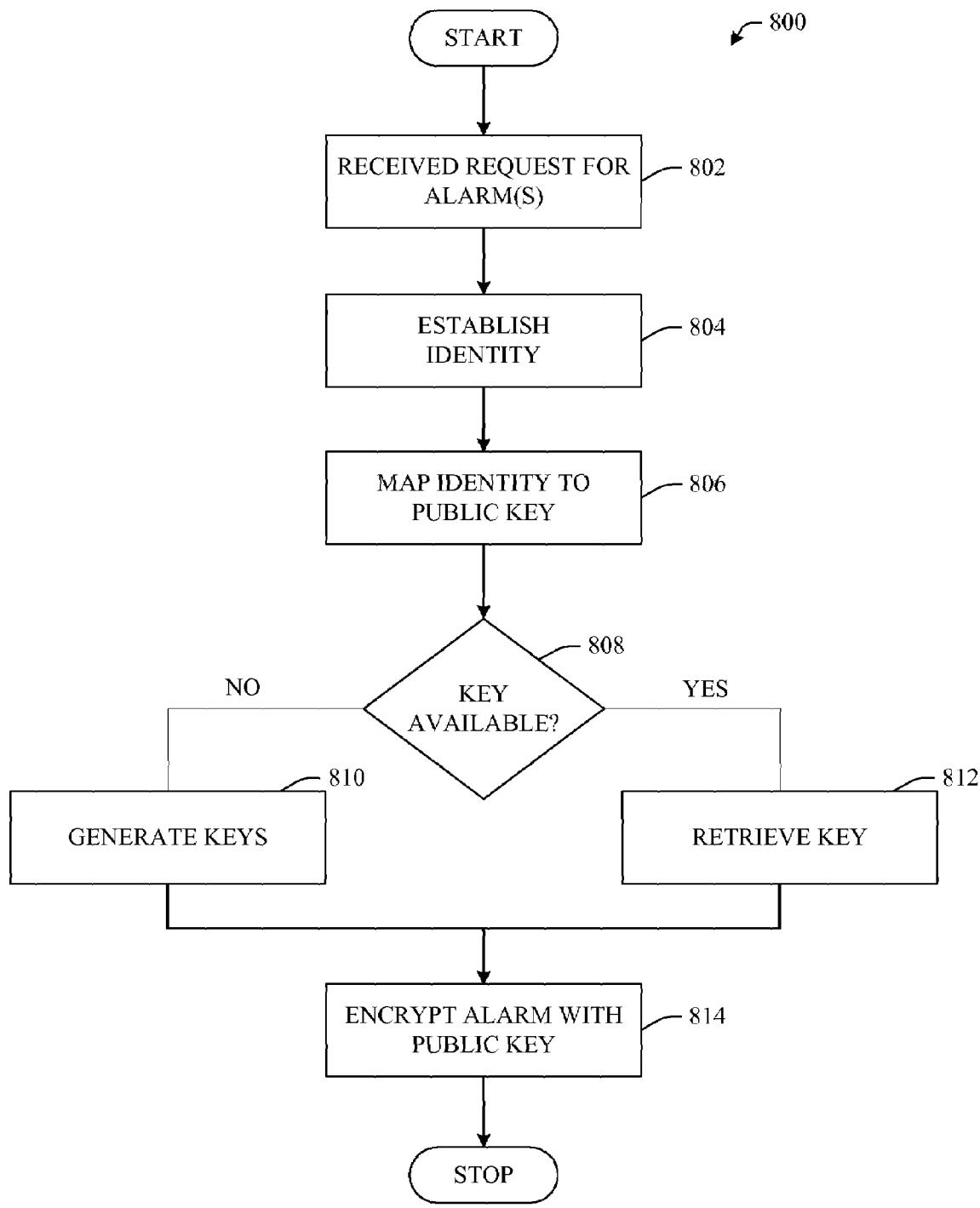
FIG. 8 is a representative flow diagram illustrating a methodology for encrypting alarms/events based upon a subscription request.

Referring now to FIG. 8, there is illustrated a methodology of mapping an identity of a subscriber to a public key in accordance with the specification. At 802, a subscription request for access to alarms/events is received. As described supra, this request can be received from a user, monitor or the like. Accordingly, at 804 identity of the requester can be established. This identity can be mapped to a public key at 806. For example, an analysis can be performed whereby a particular public key is located with respect to the established identity. It is to be understood that other aspects can employ alarm/event type, sensitivity (e.g., confidential), context, etc. to map to an appropriate key.

Once the key is identified, at 808, a determination is made if the key is available. For example, a determination can be made if the key is available in a local key store. If not available, at 810, a cryptographic key(s) can be generated. In this scenario, the private portion of a key pair can be securely sent to an entity utilizing a digital envelope or the like.

If, however, at 808 the key is found to be available (e.g., in a key store), the key can be retrieved at 812. In either case, once a key is obtained, the key can be used at 814 to encrypt the alarm/event data. Although the aspects described herein suggest a single encryption of an alarm, it is to be understood that a single alarm can be encrypted multiple time as well as with multiple keys. These alternative aspects are to be included within the scope of this disclosure and claims appended hereto.

Figure 9:
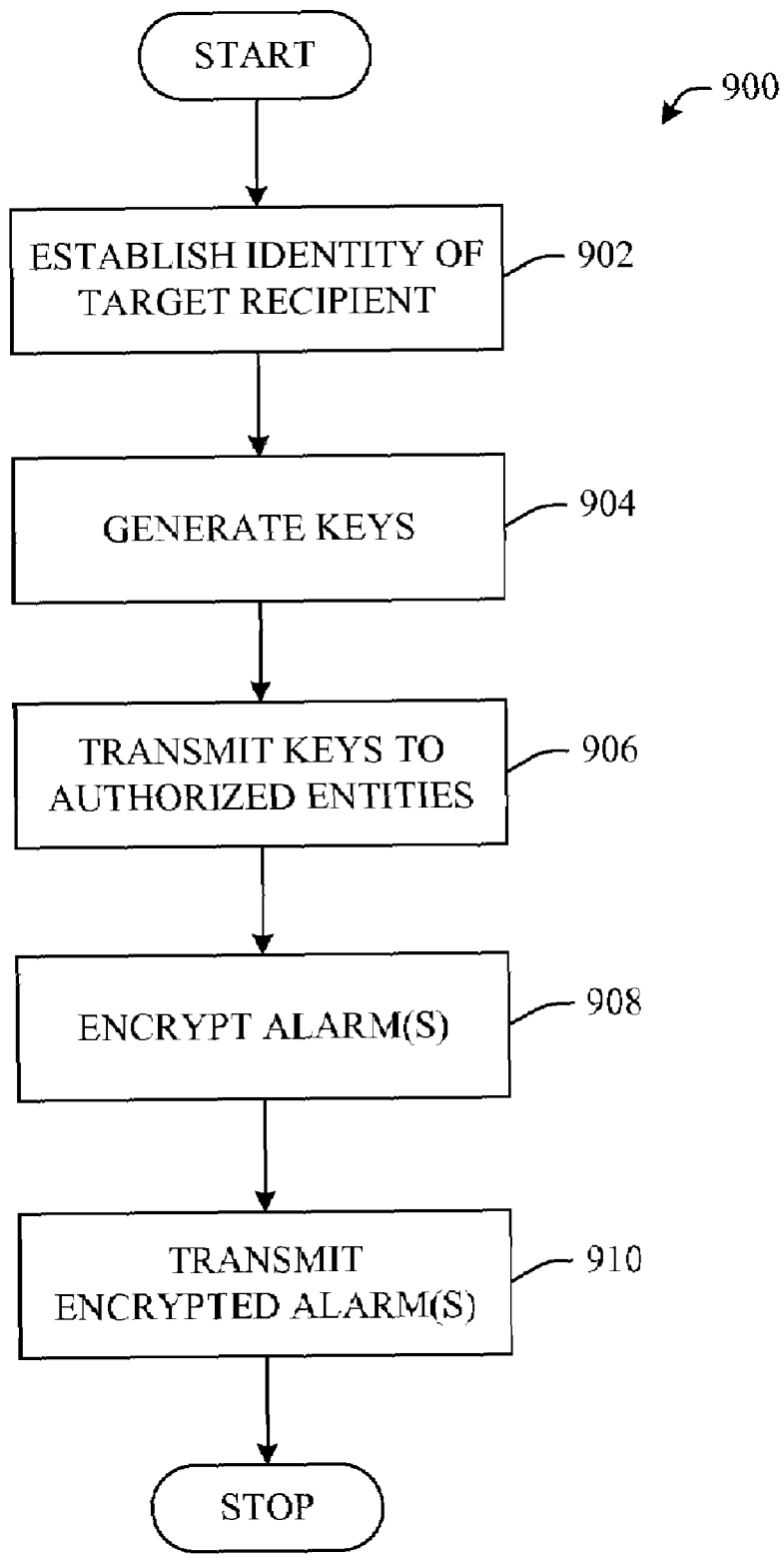
FIG. 9 is a representative flow diagram that illustrates a methodology for generating an appropriate cryptographic key pair.

FIG. 9 illustrates a methodology of encrypting alarms/events as a function of a target recipient in accordance with the specification. At 902, identity of a target recipient can be established. This identity can be a function of alarm/event type, context, availability, urgency, etc. Once the identity is established, cryptographic keys can be generated at 904. In an alternative aspect, a public key can be located, for example, from a key store.

Once the keys are generated (or located), at 906, the keys can be transmitted to the authorized entity(ies). As described above, a secure envelope can be used to transmit the keys to the authorized entity(ies). The alarm/event data can be encrypted utilizing a public key portion of the key pair at 908. Finally, the encrypted alarms can be transmitted at 910.

Figure 10:
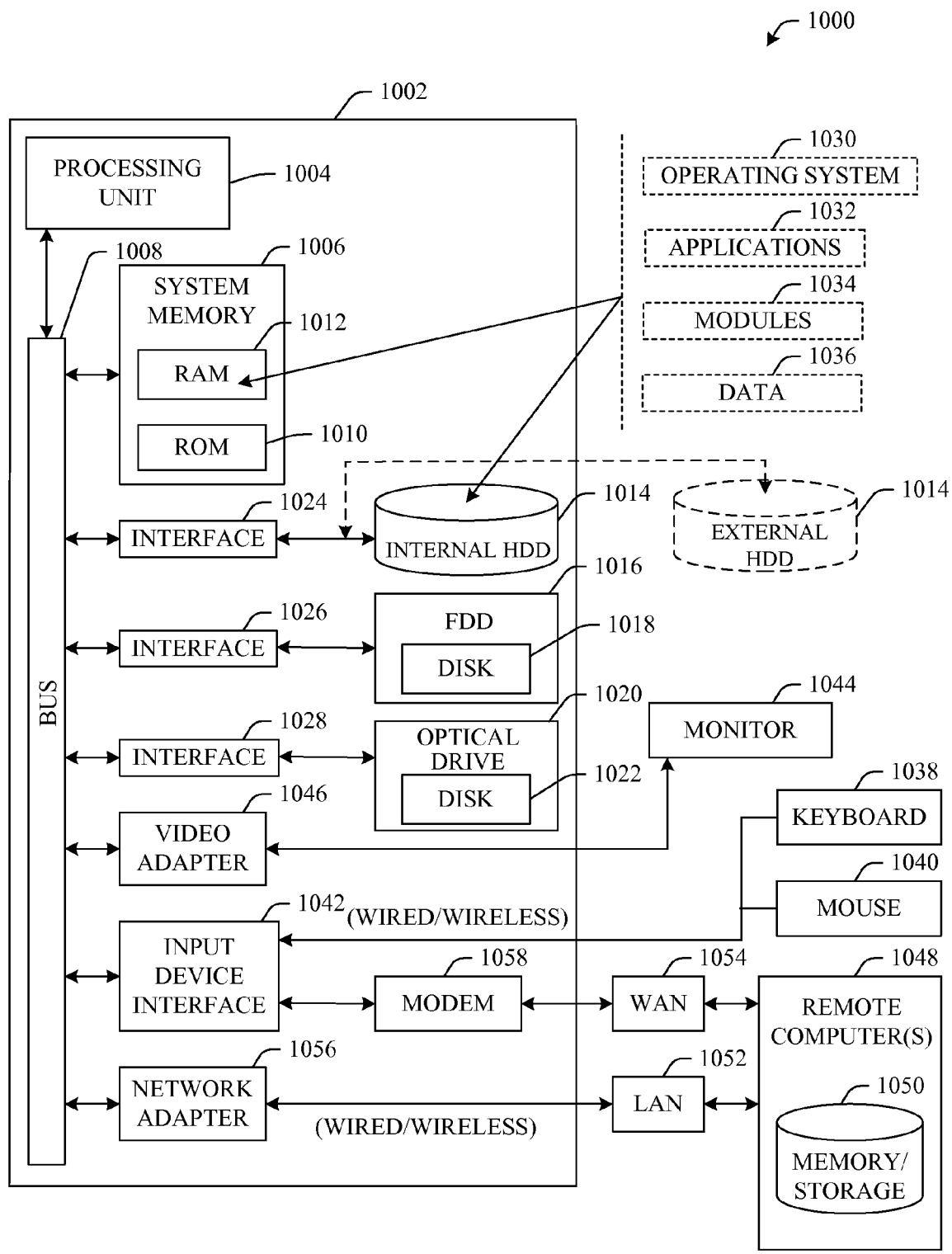
FIG. 10 is an example computing environment.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The aspects illustrated herein can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
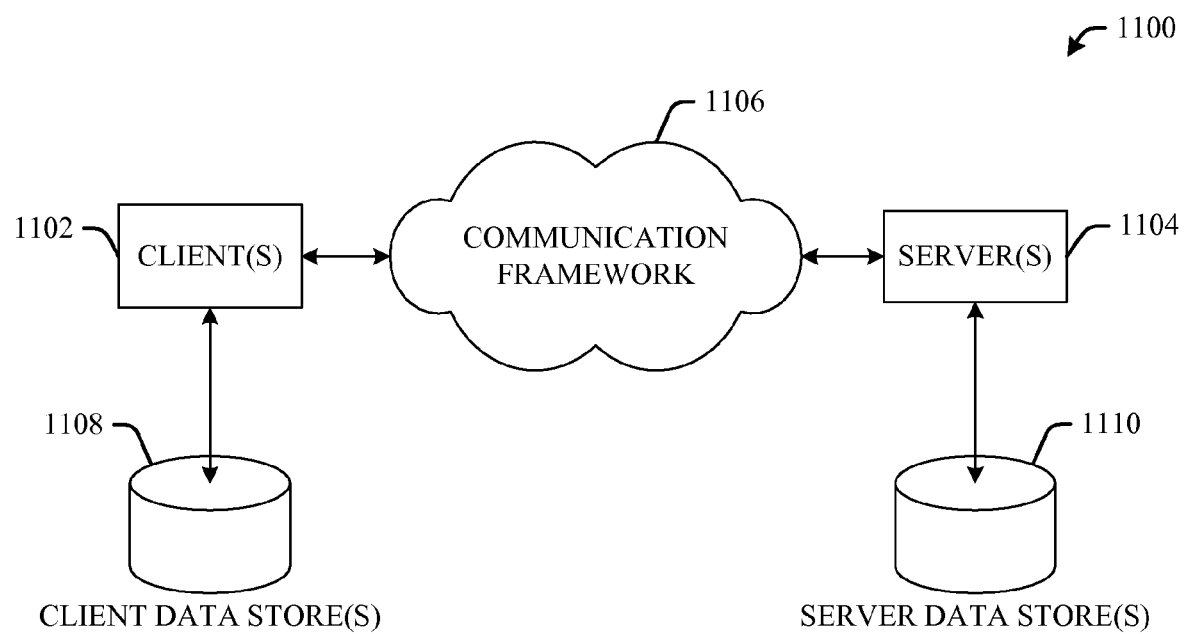
FIG. 11 is an example networking environment.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1 104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A security system in an industrial automation environment, comprising:
    a receiver component that receives an alarm related to a field device;
    an encryption component that encrypts the alarm with an encryption algorithm and secures delivery to an external entity; and
    an automatic classifier system that facilitates the selection of the encryption algorithm, the classifier determining the necessity and type of encryption.

2. The system of claim 1, further comprising a field device that generates the alarm.

3. The system of claim 2, further comprising an alarm generator component that establishes the alarm.

4. The system of claim 1, the encryption component employs a cryptographic key to protect the alarm.

5. The system of claim 1, further comprising a plurality of field devices, one of the field devices generates the alarm.

6. A security system in an industrial automation environment, comprising:
    a receiver component that receives a request to subscribe to an alarm; and
    an encryption component that encrypts and communicates the alarm to an entity, the encryption component employing an encryption algorithm selected using an automatic classifier system.

7. The system of claim 6, the entity is one of a user and a monitor server.

8. The system of claim 6, further comprising a field device that generates information that identifies the alarm.

9. The field device of claim 8 being a controller.

10. The system of claim 6, further comprising a key management component that identifies a cryptographic key, the encryption component employs the cryptographic key to encrypt the alarm.

11. The system of claim 10, further comprising a key retrieval component that retrieves the key based upon identity of the entity.

12. The system of claim 11, the key is a public key that corresponds to a private key associated with the entity.

13. The system of claim 12, further comprising a key store that maintains the public key related to the entity.

14. The system of claim 6, further comprising a key management component that establishes a cryptographic key pair, the encryption component employs one of the cryptographic key pair to encrypt the alarm.

15. The system of claim 14, further comprising a key generation component that generates the cryptographic key pair based at least in part upon identity of the entity.

16. The system of claim 15, further comprising a key distribution component that securely delivers one of the cryptographic key pair to the entity, the entity employs the one of the cryptographic key pair to decrypt the alarm.

17. The system of claim 6, the entity is an authorized user.

18. The system of claim 6, the entity is a remote access server.

19. A controller comprising the system of claim 6.

20. A method for securing an alarm/event, comprising:
generating one of an alarm and an event within a field device; and
encrypting the one of an alarm and an event using one of a cryptographic key pair, wherein locating the one of the cryptographic key pair is based at least in part upon a characteristic of the one of an alarm and an event.

21. The method of claim 20, further comprising:
transmitting the encrypted one of an alarm and an event; and
employing the other of the cryptographic key pair to decrypt the alarm.

22. The method of claim 20, further comprising:
receiving a request for the one of an alarm and an event from an entity;
establishing identity of the entity; and
encrypting the one of an alarm and an event as a function of the identity.

23. The method of claim 22, further comprising mapping the identity to a public key, the public key is used to encrypt the one of an alarm and an event.

24. The method of claim 22, further comprising retrieving a key as a function of the identity and employing the key to encrypt the one of an alarm and an event.

25. The method of claim 20, further comprising generating a cryptographic key pair, one of the cryptographic key pair is employed to encrypt the one of an alarm and an event and the other of the cryptographic key pair is employed to decrypt the one of an alarm and an event.

* * * * *